US012686628B2

(12) United States Patent
Rapenne et al.

(10) Patent No.: US 12,686,628 B2
(45) Date of Patent: Jul. 21, 2026

(54) METHOD FOR CUTTING A LAMINATED GLAZING BY MEANS OF A LASER SOURCE

(71) Applicant: SAINT-GOBAIN GLASS FRANCE, Courbevoie (FR)

(72) Inventors: Thibault Rapenne, Noyon (FR); Alexandre Fessemaz, Aachen (DE); Tobias Nielsen, Cologne (DE)

(73) Assignee: SAINT-GOBAIN SEKURIT FRANCE, Courbevoie (FR)

( * ) Notice: Subject to any disclaimer, the term of this patent is extended or adjusted under 35 U.S.C. 154(b) by 321 days.

(21) Appl. No.: 18/550,038

(22) PCT Filed: Mar. 28, 2022

(86) PCT No.: PCT/FR2022/050566
§ 371 (c)(1),
(2) Date: Sep. 11, 2023

(87) PCT Pub. No.: WO2022/208008
PCT Pub. Date: Oct. 6, 2022

(65) Prior Publication Data
US 2024/0150216 A1 May 9, 2024

(30) Foreign Application Priority Data

Apr. 2, 2021 (FR) ...................................... 2103461

(51) Int. Cl.
*C03B 33/07* (2006.01)
*B23K 26/38* (2014.01)
(Continued)

(52) U.S. Cl.
CPC ............ *C03B 33/078* (2013.01); *B23K 26/38* (2013.01); *B32B 3/266* (2013.01);
(Continued)

(58) Field of Classification Search
None
See application file for complete search history.

(56) References Cited

U.S. PATENT DOCUMENTS 3,885,353 A 5/1975 Ota et al.
2006/0005482 A1* 1/2006 Bennison .......... B32B 17/10036
52/204.5
(Continued)

FOREIGN PATENT DOCUMENTS

CN 104326649 A 2/2015
DE 29716365 U1 * 1/1998
(Continued)

OTHER PUBLICATIONS

Machine Translation of DE29716365U1, Jan. 1998 (Year: 1998).*
(Continued)

*Primary Examiner* — Queenie S Dehghan
(74) *Attorney, Agent, or Firm* — CUSHMAN PARTNERS, LLC

(57) ABSTRACT

A laminated glazing having at least one cut-out and a method for cutting a laminated glazing, particularly for a motor vehicle, including at least a first glass sheet, a second glass assembled by an interlayer including at least one sheet of polymer material, the glazing further including an insert having a hole delimited by an inner contour, the insert being housed in a recess provided in the interlayer, the method including detecting, by a vision device, the inner contour; calculating a cutting path to be traveled based on the detection of the inner contour; and cutting, by a laser source having a beam, the first glass sheet based on the calculated cutting path.

10 Claims, 4 Drawing Sheets

(51) Int. Cl.
     *B32B 3/26*        (2006.01)
     *B32B 17/10*       (2006.01)
     *C03B 33/02*       (2006.01)
(52) U.S. Cl.
     CPC .. *B32B 17/10036* (2013.01); *B32B 17/10165*
          (2013.01); *C03B 33/0222* (2013.01); *B32B*
          *2605/006* (2013.01)

(56)                References Cited

U.S. PATENT DOCUMENTS

2018/0118603  A1      5/2018  Nieber et al.
    2020/0117034  A1 *    4/2020  Yin ........................ G06F 1/1605

FOREIGN PATENT DOCUMENTS

DE        102017008884  A1 *   3/2019   ....... B32B 17/10761
    FR          2 204 992  A5     5/1974

FR          2 549 465  A1     1/1985
    FR          2 642 419  A1     8/1990
    FR          2 862 056  A1     5/2005
    WO      WO 2013/054059  A1     4/2013
    WO      WO 2014/057200         4/2014
    WO       WO-2021105958  A1 *   6/2021   ............ B32B 3/266
    WO      WO 2021/191549  A1     9/2021

OTHER PUBLICATIONS

Machine Translation of DE102017008884A1, Mar. 2019 (Year: 2019).*
EP 4 126 527 machine translation, Berthe et al., Laminated Glazing for a Motor Vehicle, Feb. 2024 (Year: 2024).*
CN 111922527 machine translation, Tu et al., A Punching Method of Laminated Glass, Nov. 2020 (Year: 2020).*
International Search Report as issued in International Patent Application No. PCT/FR2022/050566, dated Jun. 27, 2022.

* cited by examiner

[Fig. 1]
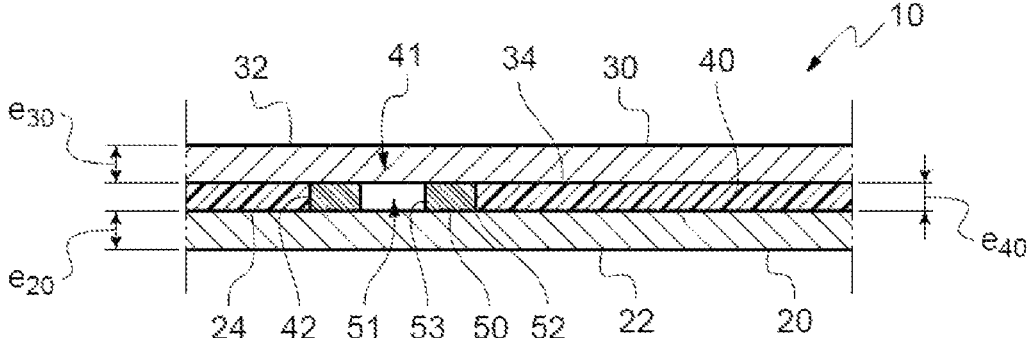
[Fig. 2]
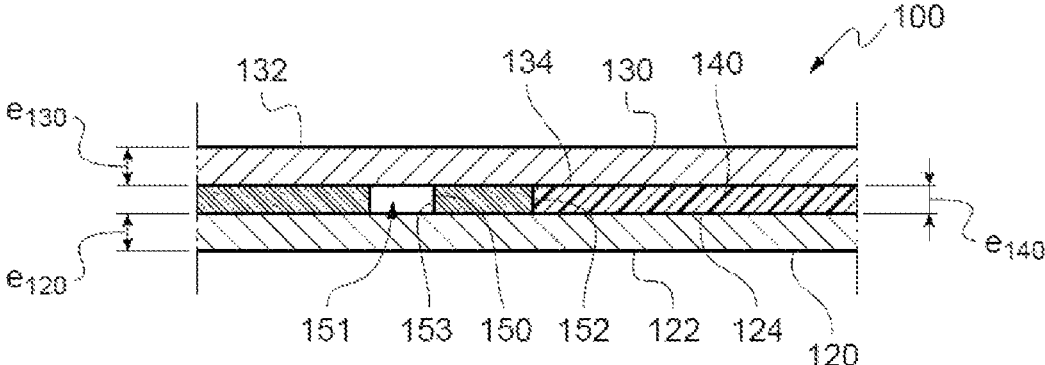
[Fig. 3]
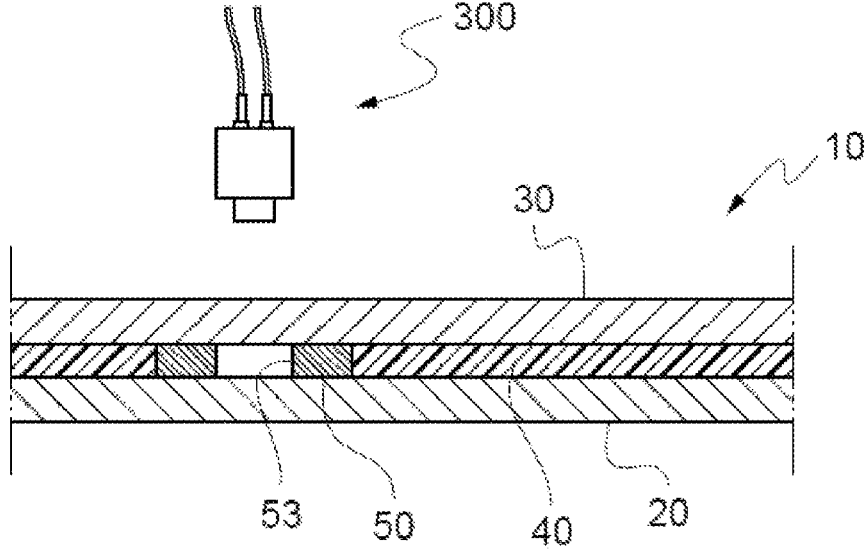

[Fig. 4]
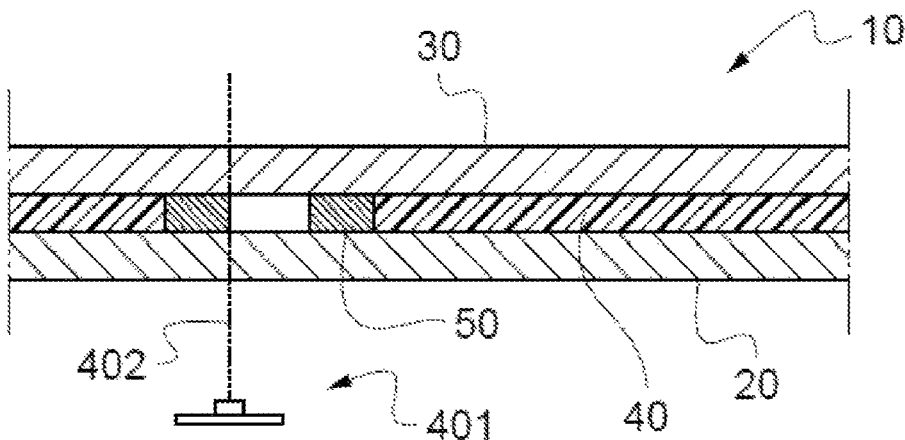
[Fig. 5]
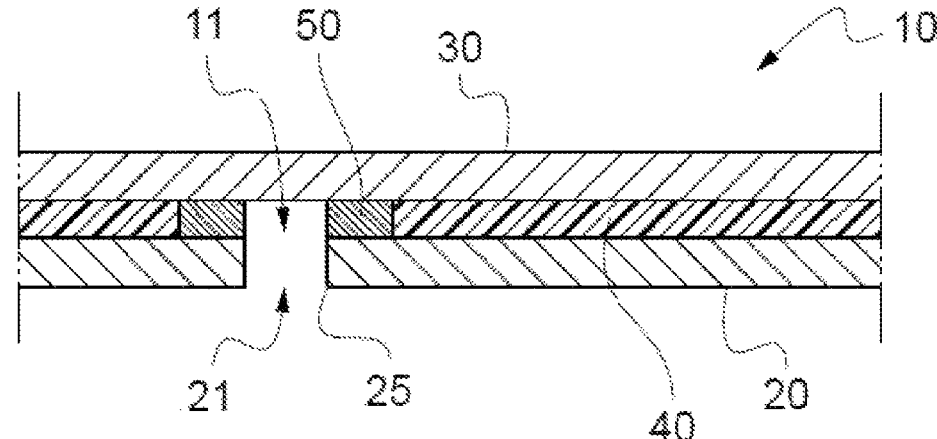
[Fig. 6]
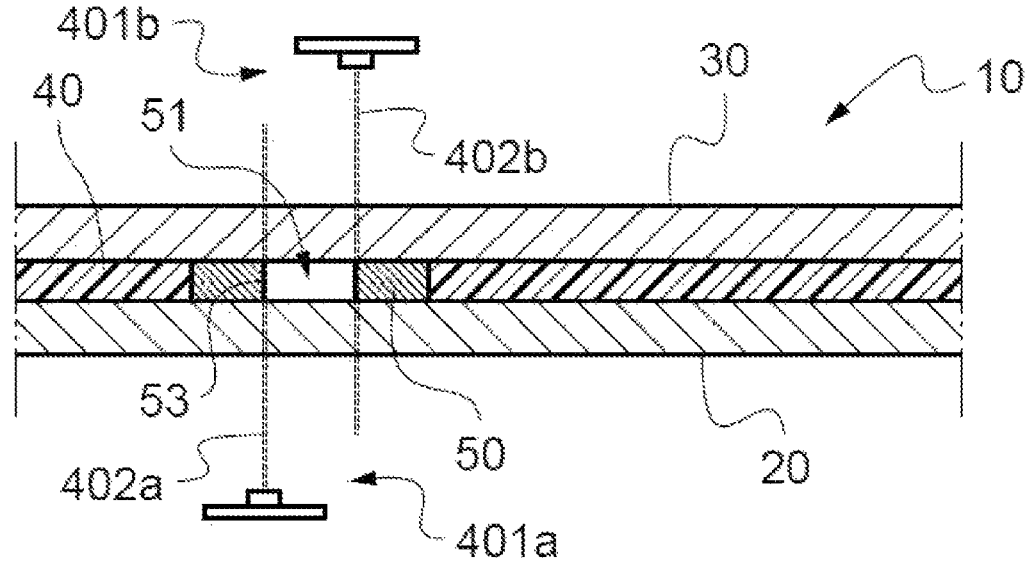

[Fig. 7]
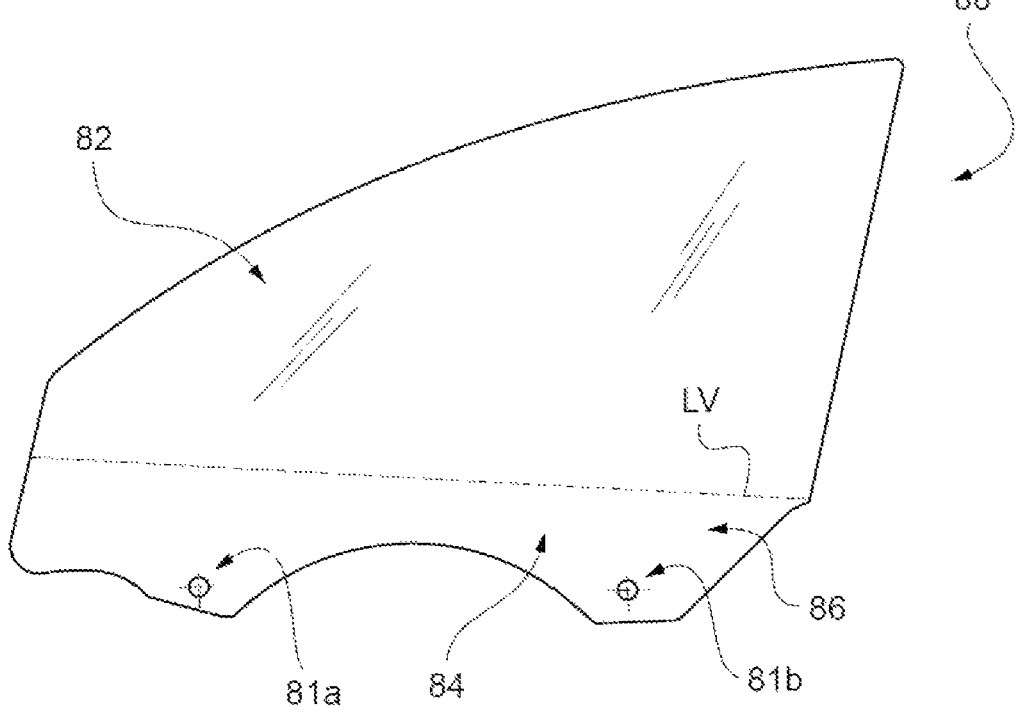
[Fig. 8]

[Fig. 9]

1

METHOD FOR CUTTING A LAMINATED GLAZING BY MEANS OF A LASER SOURCE

CROSS-REFERENCE TO RELATED APPLICATIONS

This application is the U.S. National Stage of PCT/FR2022/050566, filed Mar. 28, 2022, which in turn claims priority to French patent application number 2103461 filed Apr. 2, 2021. The content of these applications are incorporated herein by reference in their entireties.

The invention relates to a method for cutting a laminated glazing, in particular for a motor vehicle.

In the field of automotive glazings in particular, there is a constant need to be able to make one or more holes through a glazing, typically obtained by boring the glass, a need for which the implementation, however, differs depending on whether it relates to a monolithic glazing or a laminated glazing.

It is recalled that a monolithic glazing comprises a single glass sheet, said sheet being for example heated to a temperature of about 650° C. then quickly cooled using air in order to temper it, i.e. thermally strengthen it, and this whilst generally giving it the desired shape.

Compared to such a monolithic glazing, a laminated glazing comprises an outer glass sheet and an inner glass sheet which are assembled by an interlayer comprising at least one sheet of polymer material, such as at least one sheet of polyvinyl butyral (PVB).

Although the boring of hole(s) in a monolithic glazing does not pose specific technical problems, this is not the case, however, for laminated glazings, even though their use is constantly increasing.

In fact, vehicle manufacturers seek, particularly for certain vehicles in their range, glazings offering the best existing properties such as, in particular, qualities of sound-deadening, resistance to forced entry, and athermal properties particularly with respect to solar radiation (UV), etc.

This is one of the reasons why it is increasingly sought to use laminated glazings in a motor vehicle, particularly but not exclusively for the side glazings.

Although it is more particularly given as an example of use hereinafter, the case of side glazings is, however, in no way limiting with respect to other types of glazing such as a windscreen, a rear window or even a roof glazing.

Compared to monolithic glazings, laminated glazings further make it possible to improve the acoustic comfort by virtue of the absorption properties of the interlayer comprising at least one sheet of polymer material, such as polyvinyl butyral (PVB), and also offer better resistance to forced entry, and novel properties such as blocking UV radiation from the sun.

However, there are technically significant differences between a monolithic glazing and a laminated glazing which means that the use of such laminated glazings is not without its problems and which, for some, have implications for the technical solutions able to be implemented in order to make the holes therein.

One of the differences is particularly the mechanical behavior such as strength; a laminated glazing does not have characteristics that are equivalent to those of a monolithic glazing. In fact, the glass sheets that make up the laminated glazing do not reach the same stress levels as monolithic glazings, particularly because of their reduced thickness which does not allow a sufficient thermal gradient to be created during cooling to generate the stresses necessary for obtaining an equivalent mechanical strength, particularly to bending.

This is the reason why such laminated glazings are also generally referred to as "hardened" or "semi-tempered" as opposed to the "tempered" designation commonly used for monolithic glazings.

For example, the use of a laminated glazing as side glazing does not pose a safety problem in itself since the sheet of polymer material of the interlayer ensures the cohesion of the assembly in the case of an accident and thus avoids the projection of pieces of glass capable of causing injuries. Compared to a monolithic glazing, it is therefore not necessary to achieve so-called "securit" fragmentation.

However, in addition to their characteristics of mechanical behavior, laminated glazings also differ from monolithic glazings in terms of the possibility of boring holes therein.

In the case of a side glazing, this relates to one or more holes intended to be traversed by attachment means in order to provide the connection between the glazing and the drive device housed in the door.

A side glazing comprising such attachment holes enables the same attachment means to be used as those used for a monolithic glazing, particularly facilitating standardization of the attachment means and, especially, interchangeability between the two types of glazings on the same vehicle.

In the absence of attachment holes, it is known to connect a laminated-like side glazing to the drive device via attachment means (also called a "holder") which are, according to a first connection type attached to the glazing by bonding or which are, according to a second connection type, attached by clamping (or pinching), generally by means of two parts arranged on either side of the glazing and press-fitted by screwing.

In addition to the shortcomings specific to each, these two types of connection do not, in particular, facilitate interchangeability between two respectively monolithic and laminated glazings.

In the case of other types of glazing, a rear window must, for example, have a hole to allow the passage of the windscreen wiper shaft, and a roof glazing will have at least one hole for mounting an antenna or even roof bars. Thus, the need to make holes in the glass is by no means limited to the attachment of side glazings but, on the contrary, relates more generally to the various laminated glazings capable of being mounted on a motor vehicle.

With respect to monolithic glazings, there are essentially two options for making a hole in a laminated glazing, in particular to obtain a through-hole.

The first option consists in making a bore in each of the glass sheets prior to assembling the glazing, whereas the second option consists of making a bore after assembling the glazing, i.e. when the two glass sheets are connected to one another by the interlayer.

Although it is common practice to make a hole prior to assembling the glazing, in particular in each of the glass sheets to obtain a through-hole, for example, intended for attachment in the case of a side glazing, this first option, however, is not without various problems.

A first problem when the hole is a through-hole is that of misalignment (or offset) between the holes of the two glass sheets, particularly due to different radii of curvature between the internal and external faces of the glass sheets. The misalignment (also called "mismatch") means that the holes made in each of the glass sheets of the glazing are not then correctly aligned with one another after assembling the glazing.

Furthermore, such misalignment does not enable the forces to be appropriately absorbed by each of the two glass sheets, generating greater stress therein, the risk of breakage thus increased, in particular during contact between a mechanical part passing through the hole and the edge of this latter.

Moreover, such misalignment is not aesthetic, which poses a particular problem when the edge of the hole is visible, but also sometimes results in a difficulty in integrating a mechanical part having adjustment tolerances that are less than the offset between the two glass sheets.

However, the shortcomings are not limited to the consequences on the laminated glazing obtained insofar as the manufacture of the glazing is also found to be impacted thereby. In fact, the centering of the two glass sheets must be performed more meticulously, so as to minimize as much as possible the misalignment between the holes in the glass sheets, which then results in the slowing of the production rates.

Generally, the manipulation of the interlayer to position it between the two glass sheets is made more complex when a hole has been made in the interlayer prior to assembly, thus making it necessary to ensure the best alignment of all of the holes, or even to make the hole therein after ensuring that the holes provided in the glass sheets are not damaged when using the cutting tool, nor leaving a surplus of polymer material.

In the absence of such a hole in the interlayer prior to assembly, another problem is then encountered due to creep of the polymer material of the interlayer in the holes during autoclaving, such that time-consuming finishing operations are then required to eliminate this.

Finally, it is difficult, in the presence of a hole in the glass sheets, to obtain good degassing (or deaeration) when assembling the laminated glazing. This is why the holes are generally temporarily plugged, for example by affixing an adhesive aluminum sheet so as to avoid any infiltration of air via the hole edge during degassing.

This therefore adds two supplementary operations, namely the positioning of the adhesive then the removal of this adhesive after assembling the glazing, i.e. after calendering, applying a vacuum via a peripheral seal or a via a vacuum bag, then a transition to a high temperature (between 80 and 120° C.) or even after the autoclaving operation.

At the very least, the first option consisting of boring the glass before assembling the glazing therefore requires at least one supplementary boring operation (one for each glass sheet) with respect to the second option consisting of making a bore after assembling the laminated glazing.

Besides the numerous aforementioned shortcomings, there is an additional problem when seeking to bore each glass sheet of a laminated glazing prior to assembly, as the boring is generally performed before its shaping, before strengthening the glass. In fact, the thickness of the glass sheets of a laminated glazing is less than that of a monolithic glazing, so that boring non-reinforced flat glass, i.e. 2D, proves to be technically challenging and results in performance losses.

Thus, it is generally difficult to bore holes with a diameter greater than 40 mm in a glass sheet having a thickness of 2.1 mm and a diameter greater than 16 mm for glass sheets with a thickness of 1.6 mm.

The second option consisting of making the bore after assembling the laminated glazing also has various shortcomings.

Compared to a bore made prior to assembly, the boring of a laminated glazing involves making holes in glass sheets which have generally undergone strengthening, generally chemical or thermal tempering.

Furthermore, the boring is thus performed on a laminated glazing having its final shape, i.e. generally a curved glass (in three dimensions or "3D") as opposed to a flat glass sheet (in "2D") when the boring is performed prior to assembly.

Consequently, the boring of the laminated glazing after assembly proves more complex to implement, particularly in order to guarantee the geometry of the hole, in particular when the glazing is curved, for example having a toroidal shape.

Moreover, conventional mechanical boring of the glass has, as such, various shortcomings. One of the shortcomings is the cutting quality which is determined by the tools, for example diamond drill bits. In fact, these drill bits create micro-defects on the cut surface of the hole, resulting in peaks from which cracks may propagate under certain stresses.

The risk of crack propagation is particularly significant in the case of side glazings comprising attachment holes as the glazings are exposed to repeated shocks, in particular when the door is slammed. These stresses may thus cause a crack to propagate, starting from a cutting defect such as micro-cracks or chips.

Furthermore, boring tools such as drill bits are subject to wear, also resulting in progressively degraded performance during boring, and requiring regrinding or even a change of drill bits in order to maintain the cutting quality at the required level.

In the case of a laminated glazing, the boring may be performed without damage, but the mechanical strength of the glass will thus be weakened. This is explained by the presence of extension stresses in the glass which exist in the median plane of each glass sheet of the glazing and which stem from the cooling of the glass from the two surfaces of each sheet.

When a hole is made, these extension stresses are modified and decrease, but a residual extension persists at the edge of the hole which then becomes a point of extreme fragility for the glass, said residual extension having, for example, a value which is half of that present prior to boring.

To remedy this problem, it has been proposed, prior to boring, to apply compressive stresses in the zone to be cut by performing contact cooling locally using a local cooling tool, for example a ring-shaped tool, the inside of which is air-cooled in order to prevent its temperature from increasing upon repeated contact with the hot glass.

For example, reference may be made to documents WO-2013/054059 or WO-2014/057200 for further details about the examples of implementation of this solution.

However, such local cooling of the glass requires the glass to be stopped in order to locally apply the cooling tool for a few seconds in contact with the surface of the glass, in order to modify the temperature gradient in the thickness of the glass.

Consequently, such a solution cannot be implemented when the manufacturing method is a continuous process during which the glass sheet is never stopped, which is typically the case of the so-called "TB" (for "Transverse Bending") manufacturing method, a method which is used particularly to manufacture side glazings.

For more information about the "TB" manufacturing method and about the installation, reference can be made, for example, to the following documents FR2204992; FR2642419, FR2549465, and FR2862056 which disclose this manufacturing method and more particularly the tool for bending glass sheets, particularly the rollers forming such a tool.

If the production of a hole in a laminated glazing implementing only mechanical boring is conceivable, advantageously after local cooling of the glass in the zone to be bored, another solution combining such mechanical boring with the use of a laser source has also been proposed.

Document CN 104326649 A discloses a method for cutting holes in a laminated glass comprising an intermediate layer having a low hardness, an upper glass sheet and a lower glass sheet.

The glass sheets are tempered and have a high hardness with respect to the hardness of the intermediate layer. It is proposed to perform a first precut by means of a laser beam on the surface of the upper glass sheet and then on the surface of the lower glass sheet so as to form a first groove and a second groove, respectively. When the grooves are made, a milling operation is performed so as to obtain a hole passing through the laminated glass.

As previously mentioned, a laminated glazing comprises an interlayer of a polymer material between a first glass sheet and a second glass sheet, the interlayer generally comprising polyvinyl butyral, better known by its acronym PVB.

However, the polyvinyl butyral produces, during heating resulting in its combustion, a gaseous release of so-called "CMR" chemical agents, the acronym meaning "Carcinogenic, Mutagenic, Reprotoxic".

Thus, it is not possible to cut the polyvinyl butyral by means of a laser source, as this would necessarily lead to the combustion of the polymer material and, consequently, the release of harmful gases.

For obvious safety reasons and for preserving the health of operators, a skilled person knows, therefore, that a laser source cannot be used to bore a laminated glazing.

According to this background art, the method therefore implements a laser source, during a first step, solely to perform a precut of the glass using the laser source and, during a second step, the glass and the polyvinyl butyral are removed by mechanical boring by virtue of which any risk of releasing harmful gases is eliminated.

Such a method is therefore particularly expensive to implement as it requires additional production means, namely, on the one hand, a laser source and, on the other hand, mechanical boring means.

The implementation of such a method also requires more time which is not compatible with the desired industrial production rates.

Moreover, the above-mentioned shortcomings related to the mechanical boring performed during this second step remain, particularly the sensitivity to wear and the cutting quality obtained with the risks of cracking resulting therefrom.

Furthermore, the geometric shape of the hole remains limited by the tools used for boring, i.e. limited to a circular shape.

Consequently, from the foregoing it is clear that none of the background art solutions are satisfactory today, regardless of whether the boring of the glass is performed prior to assembling the laminated glazing or after assembling the laminated glazing.

The purpose of the invention is therefore particularly to overcome the shortcomings of the prior at by proposing a method for cutting a laminated glazing, by means of a laser source, which is reliable and quicker to perform than the methods proposed in the background art.

To this end, the invention proposes a method for cutting a laminated glazing, particularly for a motor vehicle, comprising at least a first glass sheet, a second glass assembled by an interlayer comprising at least one sheet of polymer material, said glazing further comprising an insert having a hole delimited by an inner contour, said insert being housed in a recess provided in said interlayer, said method comprising the following steps:

a step of detecting, by means of a vision device, said inner contour;

a step of calculating a cutting path to be traveled based on the detection of said inner contour;

a step of cutting, by means of a laser source having a beam, said first glass sheet based on said calculated cutting path.

Advantageously, the method according to the invention proposes making at least one cut-out in a laminated glazing, i.e. a laminated glazing as obtained after assembling the first glass sheet and the second glass sheet by means of the interlayer, such a laminated glazing then forming a unitary assembly, the glass sheets of which are joined together.

Preferably, the laminated glazing is an automotive glazing such as a side glazing intended to be slidably mounted in a door of a motor vehicle. Thus, the cut-out made in the laminated glazing is for example at least one hole, such as an attachment hole in the case of a side glazing.

However, such a side glazing is only one non-limiting example of automotive glazing wherein it is sought to make a cut-out, particularly but not exclusively a hole. Although this can vary according to the vehicle, a side glazing generally comprises two attachment holes and since a vehicle usually has four side windows, this makes a particularly interesting example of use of the cutting method according to the invention.

According to another example of use, the laminated glazing could also be a rear window of a vehicle wherein the hole is intended to facilitate the assembly of a wiper, generally for the passage of the wiper shaft connected to drive means.

According to another example of use, the laminated glazing could be a roof (or ceiling) wherein the cut-out or cut-outs are intended for mounting an antenna or even roof bars.

Advantageously, the glass of the laminated glazing is cut after having been assembled and not prior to assembly, i.e. in the almost-finished product state, particularly in these automotive glazing examples.

Thus, prior to the detection step of the method, the assembly of said laminated glazing is performed, for example a step of clamping said glazing by means of retaining devices, such as clamps, or a calendering step and generally an autoclaving step.

Advantageously, the cutting method according to the invention makes it possible to make the cut-out or cut-outs in the laminated glazing with complete freedom in terms of the cutting shape, said shape may further be circular, typically a hole, but of course also be non-circular.

Advantageously, the cutting method according to the invention makes it possible to make at least one cut-out in the laminated glazing with extremely high precision. The method according to the invention makes it possible, in particular, to obtain excellent coaxiality, by virtue of the insert bored, for example, with a hole and the precision of the laser, and this regardless of the cut-out made in the laminated glazing, particularly a blind hole or a through-hole.

The cutting precision, just like the coaxiality, for example of the attachment holes for a side glazing, are particularly crucial for the quality of the laminated glazing insofar as they contribute to significantly reducing the risks of breakage in the zone of the glazing comprising the cut-out, particularly due to the presence of microcracks in the glass resulting from said cutting.

Moreover, compared to the background art, the coaxiality defects encountered up until now are remedied, particularly in the case of a side glazing, and the holes in the glass sheets are made prior to assembling the laminated glazing, with a misalignment problem (or "mismatch") then occurring during assembly or even when each glass sheet is bored after assembly as the misalignment problem between the axes of the holes made in each of the sheets then remains and increases with the precision uncertainties of mechanical boring.

According to one particularly advantageous feature, the insert in the laminated glazing is not visible regardless of the vehicle glazing. In the case of a side glazing, the part comprising the attachment holes is located inside the door (i.e. below the limit of visibility of the glazing) and is therefore never visible. However, in the case of a roof or a rear window, the insert may also be invisible because, for example, it is covered by an add-on part such as the antenna or a part of the window wiper or even concealed by an enamel layer of the glazing.

According to one important feature, the insert is housed in a recess (or a cut-out) provided in the interlayer by virtue of which no polymer material is present around the hole of the insert, i.e. at least in the part of the glazing in which the cut-out is made so that the risk of gaseous release of CRM chemical agents is completely eliminated.

Thus, the invention goes against the technical prejudices of the skilled person, for whom the presence of the interlayer of polymer material rules out the use of a laser source, in particular to make a through-hole in a laminated glazing.

Advantageously, the cutting carried out by means of a laser source in accordance with the invention guarantees a constant cutting quality during the manufacture of laminated glazings, particularly compared to mechanical boring, the cutting quality with a laser is not impacted over time by wear as it is the case for a tool.

In addition, the laser cutting method makes it possible to obtain clean cutting edges, with little debris and which, furthermore, do not subsequently require a polishing step as is usually implemented after mechanical boring.

Compared to mechanical boring, the laser cutting is performed remotely, "contact free", insofar as only the beam emitted by the laser source comes into contact with the glass sheet.

Advantageously, the laser cutting method according to the invention allows for minimum material loss with respect to mechanical boring, for example with a diamond drill bit having a cutting width close to 1 mm.

Advantageously, the laser source used during the cutting step of the method according to the invention is also able to be used to perform other operations such as chamfering or even ablation of a coating (or paint) on the laminated glazing.

Thus, the production costs are further improved by using the laser source to perform various operations and not only the cutting.

Advantageously, the power of the laser source is able to be adjusted based on the operation, for example with low power for ablation, then with a higher power for cutting.

Preferably, during the calculation step, a shrinkage with respect to said inner contour between 0.1 mm and 1 mm, or even between 0.5 mm and 1 mm, is calculated so that said beam does not reach the insert during the cutting step.

Advantageously, during the cutting step, said second glass sheet is also cut based on said cutting path calculated by means of said laser source.

Preferably, the cutting method further comprises a chamfering step by means of said laser source consisting of chamfering at least one edge of a hole in said first glass sheet resulting from the cutting step.

Preferably, the cutting method further comprises a step of chamfering by means of said laser source at least one chamfer on an edge of said first glass sheet and/or on an edge of said second glass sheet of a through-hole resulting from the cutting step.

Advantageously, the chamfering step and the cutting step are performed with the same laser source, the costs and the production times of which are particularly reduced with respect to the background art in which each of these steps is to be performed with a different tool.

Advantageously, the chamfering of the edge of a cut-out such as a hole made in at least one of the glass sheets according to the method of the invention makes it possible to reduce the risks of breakage.

Preferably, the method further comprises an additional cutting step of said glass sheet by means of an additional laser source having a beam based on said calculated cutting path.

Preferably, the cutting step and the additional cutting step are executed simultaneously.

Preferably, the cutting step and the additional cutting step are executed consecutively, for example herein the cutting step is executed first then the additional cutting step.

Advantageously, the cutting of the glazing is performed without the glass sheet or sheets having undergone local cooling in the cutting zone, as a variant, local cooling is performed on at least one or both glass sheets of the glazing.

The invention also relates to a laminated glazing comprising at least one cut-out obtained by the method according to the invention by virtue of which said glazing comprises at least one hole in the first glass sheet or at least one through-hole in the first glass sheet and the second glass sheet which is coaxial to said hole of the insert.

Advantageously, said cut-out has a roughness of less than 3 μm, preferentially less than 2 μm, even more preferentially less than 1 μm.

In comparison, the roughness obtained with mechanical boring is generally about 1.5 to 2 μm so that the cutting by means of a laser source makes it possible to considerably reduce the microscopic defects such as "chips" which contribute to increasing the risk of the glass breaking, particularly of cracks in the zone of the glazing comprising the cut-out.

Advantageously, at least one of the glass sheets is thermally strengthened, preferably the first glass sheet and the second glass sheet are thermally strengthened, preferentially the thermal strengthening is of the semi-tempered or hardened type, or even annealed.

In fact, the thermal strengthening of at least one of the glass sheets of the glazing or advantageously of the two glass sheets is an operation performed prior to the assembly of the laminated glazing so that, during the implementation of the laser cutting method according to the invention, each glass sheet has a hardness determined by the thermal reinforcement applied in order to compress the outer layers of the glass so as to improve the mechanical strength thereof.

Preferably, the first glass sheet and the second glass sheet are of the same composition, particularly a soda-lime, aluminosilicate, borosilicate-like composition. As a variant, the first glass sheet and the second glass sheet are of a different composition.

According to one example, the first glass sheet and the second glass sheet are of the same thickness so as to form a symmetrical laminated glazing and said thickness of the glass sheets is between 0.7 mm and 3 mm, preferentially between 1.1 mm and 2.6 mm.

According to another example, the first glass sheet and the second glass sheet have a different thickness so as to form an asymmetrical laminated glazing, the first glass sheet having a thickness between 1.5 mm and 3.5 mm and the second glass sheet having a thickness between 0.4 mm and 2.6 mm, preferentially between 0.7 mm and 1.6 mm.

Preferably, the first glass sheet and the second glass sheet are of the same hue, particularly clear glass, green glass or dark (or gray) glass. As a variant, the first glass sheet and the second glass sheet are of a different hue.

According to other features, the invention also relates to a data-processing system comprising a processor configured to implement the steps of the method according to the invention.

The invention further relates to a computer program-like product, comprising at least one sequence of instructions stored and able to be read by a processor and which, once read by the processor, causes the execution of the steps of the method according to the invention.

The invention also relates to a computer-readable medium comprising said computer program-like product.

A plurality of embodiments of the present invention will be described below, by way of non-limiting examples, with reference to the appended figures, in which:

FIG. 1 schematically illustrates a cross-sectional view of a laminated glazing, according to a first configuration, before the implementation of the cutting method according to the invention;

FIG. 2 schematically depicts a cross-sectional view of a laminated glazing, according to a second configuration, before the implementation of the cutting method according to the invention;

FIG. 3 schematically depicts a step of detecting an inner contour of the hole in an insert integrated into the laminated glazing, according to the first configuration, using a vision system, such as a camera, according to the method of the present invention;

FIG. 4 schematically illustrates a step of cutting, using a device comprising a laser source, a glass sheet of the laminated glazing in accordance with the first configuration, according to the method of the present invention;

FIG. 5 schematically depicts a cross-sectional view of the laminated glazing, according to said first configuration, comprising a cavity obtained by the cutting method according to the invention;

FIG. 6 schematically depicts a cutting step of the laminated glazing, according to the first configuration, using two devices each comprising a laser source;

FIG. 7 schematically depicts a laminated glazing, according to the first configuration, comprising a through-hole, obtained by the cutting method according to the invention;

FIG. 8 schematically illustrates a side view of a side laminated glazing comprising two attachment holes, obtained using the method according to the invention;

Figure 9:
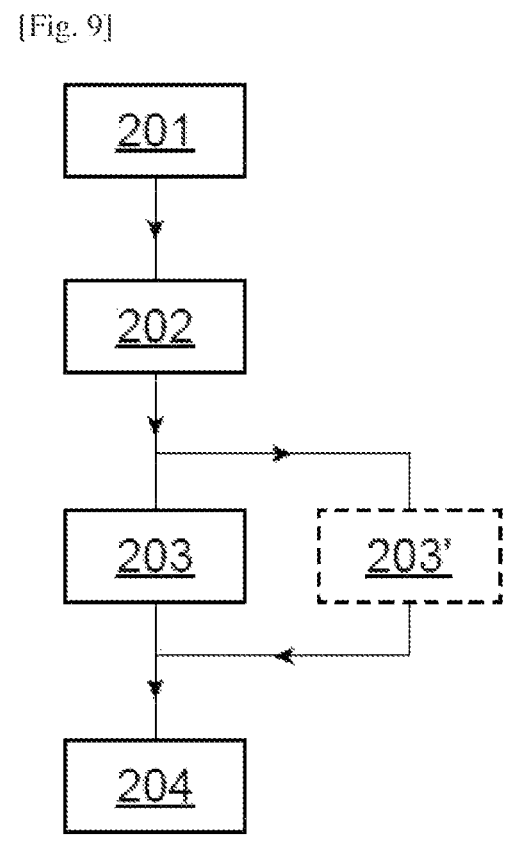

FIG. 9 schematically depicts the steps of the method for cutting a laminated glazing according to the invention, namely at least a detection step, a calculation step and a cutting step, or even an additional cutting step (dotted line).

Referring to [FIG. 1], it schematically illustrates, in a side view, a laminated glazing 10, according to a first configuration, comprising a first glass sheet 20, a second glass sheet 30 and an interlayer 40.

The laminated glazing 10 according to the invention will be described by way of non-limiting example in the context of a use as side glazing. As a variant, the laminated glazing 10 is a windscreen, a rear window or a roof.

The first glass sheet 20 comprises an outer face 22 and an inner face 24 and the second glass sheet 30 comprises an outer face 32 and an inner face 34.

Preferably, the interlayer 40 comprises a single sheet of polymer material. Preferably, the interlayer 40 is a sheet of polyvinyl butyral (PVB). Alternatively, the interlayer 40 is a multilayer structure, that is to say made up of more than one sheet.

The interlayer 40 comprises for example two sheets of polymer material such as a first sheet and a second sheet respectively of polyvinyl butyral (PVB) one of which advantageously has sound-deadening properties. This multilayer structure forming the interlayer 40 is also referred to as a "bilayer".

As a variant, the interlayer 40 may comprise more than two sheets and for example consist of three sheets of polymer material, or a "trilayer", comprising a sheet of polyethylene terephthalate (PET) disposed between two sheets of polyvinyl butyral (PVB) one of which advantageously has sound-deadening properties or else a sheet of polyvinyl butyral (PVB), which advantageously has sound-deadening properties, is disposed between two sheets of polyvinyl butyral (PVB).

The first glass sheet 20 and the second glass sheet 30 have a curved shape, in this first configuration of the glazing 10 as side glazing. Alternatively, the first glass sheet 20 and the second glass sheet 30 have a planar shape.

Preferably, the first and second glass sheets 20, 30 are thermally strengthened, particularly semi-tempered or hardened. In one alternative, they are chemically tempered.

The first glass sheet 20 and the second glass sheet 30 have a thickness $e_{20}$ and a thickness ego, respectively.

Preferably, the thickness $e_{20}$ and the thickness ego are substantially equal. In one alternative, the thickness $e_{20}$ is less than the thickness ego. In another alternative, the thickness $e_{20}$ is greater than the thickness ego.

The interlayer 40 has a thickness $e_{40}$, preferably between 0.3 mm and 1.2 mm, and comprises a recess 41, i.e. a cut-out, preferably having a cylindrical shape and an inner contour 42. In one alternative, the recess 41 has a shape other than cylindrical, such as a square, rectangular, oval or elliptical shape. The recess 41 is formed prior to the assembly of the glazing 10.

The glazing 10 further comprises an insert 50 which is housed in the recess 41 provided in the interlayer 40, said recess 41 advantageously having a complementary shape to that of the insert 50.

Preferably, the insert 50 is in direct contact with the inner face 24 of the first glass sheet 20 and with the inner face 34 of the second glass sheet 30. The insert 50 is thus interposed between the first glass sheet 20 and the second glass sheet 30.

The insert 50 comprises at least one hole 51. Preferably, the hole 51 is cylindrical in shape. Alternatively, the hole 51 has a square, rectangular, oval or elliptical shape.

In another alternative, the hole 51 has a first cylindrical shape having a first diameter and a second cylindrical shape having a second diameter, the first diameter being greater than the second diameter.

Thus, the hole 51 is not limited to the various shapes mentioned, but, on the contrary, to all the shapes that can be obtained by means of a device equipped with a laser source, not disclosed in an exhaustive manner in the present disclosure.

The insert 50 has an outer contour 52 and an inner contour 53, said inner contour 53 determined by the hole 51 of the insert. Thus, the inner contour 53 has a shape which matches that of the hole 51, i.e. herein circular.

The insert 50 has a hardness greater than that of the interlayer 40, said material of the insert having, for example, a Shore D hardness between 70 and 90.

As shown in [FIG. 1], the insert 50 has an annular shape, for example herein a washer or flat-ring shape.

Preferably, the insert 50 has an outer diameter comprised between 10 mm and 30 mm, or even between 15 mm and 25 mm.

The insert 50 has a thickness which is equal to more or less 10% of the thickness of the interlayer 40, preferentially equal to more or less 5% of the thickness of the interlayer 40 and even more preferentially to more or less 2% of the thickness of the interlayer 40.

The inner contour 42 of the recess 41 and the outer contour 52 of the insert 50 are advantageously complementary so that at least one part, herein the entirety, of the insert 50 is in contact with the interlayer 40.

By virtue of the recess 41 in the interlayer 40, there is only polymer material around the insert 50, following its inner contour 42, but not at the hole 51 of the insert 50.

Advantageously, the insert 50 is capable of forming a spacer suitable for limiting the creep of the polymer material of the interlayer 40, particularly during the assembly of the glazing 10 which is generally performed in an autoclave at a temperature of approximately 140° C., or subsequently due to the clamping forces applied by the attachment means.

However, the material of the insert 50 is selected such that it does not creep at a temperature less than 140° C.

Advantageously, the insert 50 is made of a plastic material, particularly polyamide (PA) for example PA 6-6, poly-oxymethylene (POM), also referred to as polyformaldehyde or polyacetal, polybutylene terephthalate (PBT), or polyethylene terephthalate (PE).

Preferably, the interlayer 40 and the insert 50 are two discrete elements, independent of one another. In one alternative, the insert 50 is connected in the interlayer 40, for example by means of adhesive tape or any other equivalent means, so that the insert 50 and the interlayer 40 form a unitary assembly, by virtue of which the positioning thereof between the first glass sheet 20 and the second glass sheet 30 during assembly is facilitated.

Referring now to [FIG. 2], it schematically illustrates, in a side view, a laminated glazing 100, according to a second configuration, comprising a first glass sheet 120, a second glass sheet 130 and an interlayer 140.

The second configuration of the laminated glazing 100 according to [FIG. 2] will be advantageously disclosed hereinafter compared to the laminated glazing 10 according to the first configuration illustrated in [FIG. 1] so that the alternative embodiments and other examples particularly disclosed previously apply mutatis mutandis to the laminated glazing 100.

The first glass sheet 120 comprises an outer face 122 and an inner face 124 and the second glass sheet 130 comprises an outer face 132 and an inner face 134.

Preferably, the interlayer 140 comprises a single sheet of polymer material such as a sheet of polyvinyl butyral. As a variant, the interlayer 140 is a multilayer structure, i.e. composed of more than one sheet, particularly two sheets ("bilayer") or even three sheets ("trilayer") as disclosed previously for the laminated glazing 10.

The first glass sheet 120 and the second glass sheet 130 of the laminated glazing 100 have a curved shape, said laminated glazing 100 forming a side glazing like the laminated glazing 10 according to the first configuration.

Alternatively, the first glass sheet 120 and the second glass sheet 130 have a planar shape. Preferably, the first and second glass sheets 120, 130 are thermally strengthened, particularly semi-tempered or hardened. In one alternative, they are chemically tempered.

The first and second glass sheets 120, 130 have a thickness $e_{120}$ and a thickness $e_{130}$, respectively. Preferably, the thickness $e_{120}$ and the thickness elm are substantially equal.

In one alternative, the thickness $e_{120}$ is less than the thickness $e_{130}$.

In another alternative, the thickness $e_{120}$ is greater than the thickness elm. The interlayer 140 has a thickness $e_{140}$, preferably between 0.3 mm and 1.2 mm.

The glazing 100 further comprises an insert 150, housed in a recess provided in the interlayer 140 and advantageously having a complementary shape.

The insert 150 comprises at least one hole 151. The insert 150 has an outer contour 152 and an inner contour 153 delimiting said hole 151.

In this second configuration, the insert 150 is in contact with the interlayer 140 on only part of its outer contour 152.

Contrary to the first configuration wherein the recess 41 was a closed shape inside which the insert 50 was housed, the recess provided in the interlayer 140 is herein a shape open towards the end of the glass sheets 120, 130.

Thus and as shown in [FIG. 2], a portion of the insert 150 (which is not in contact with the interlayer 140) is flush with the first and second glass sheets 120, 130.

The insert 150 is generally plate-shaped, the outer perimeter 152 of which may have different geometric shapes, for example a square or rectangular shape, preferentially a trapezoid shape.

Preferably, the hole 151 is cylindrical in shape. Alternatively, the hole 151 has any other geometric shape such as a square, rectangular, oval or elliptical shape. Thus, the hole 151 is not limited to the various shapes mentioned, but, on the contrary, to all the shapes that can be obtained by means of a device equipped with a laser source, not disclosed in an exhaustive manner in the present disclosure.

The insert 150 has a hardness greater than that of the interlayer 140, said material of the insert having, for example, a Shore D hardness between 70 and 90.

The insert 150 has a thickness which is equal to more or less 10% of the thickness of the interlayer 140, preferentially equal to more or less 5% of the thickness of the interlayer 140 and even more preferentially to more or less 2% of the thickness of the interlayer 140.

Advantageously, the insert 150 is capable of forming a spacer suitable for limiting the creep of the polymer material of the interlayer 140, particularly during the assembly of the glazing 100 or subsequently due to the clamping forces applied by the attachment means.

Advantageously, the insert 150 is made from a plastic material, such as those disclosed previously for the insert 50.

Preferably, the insert 150 and the interlayer 140 are discrete. In one alternative, the insert 150 is formed integrally with the interlayer 140, i.e. the insert 150 and the interlayer 140 form a unitary assembly.

International application PCT/FR2021/050485 (unpublished) filed under priority of French application FR2002921 dated 25 Mar. 2020 discloses and depicts other embodiments of laminated glazing comprising such an insert and other advantages so that reference will be advantageously made thereto for more details.

In the disclosure of the method according to the invention which follows, reference is made to the laminated glazing 10, according to the first configuration, illustrated in [FIG. 1]. The disclosure of the method also applies to the laminated glazing 100, according to the second configuration illustrated in [FIG. 2].

FIG. 9 schematically shows the various steps of the cutting method according to the invention, the dotted lines corresponding to an optional step.

Referring to [FIG. 3], it schematically illustrates a first step of the method according to the invention, namely a detection step 201. During this step, a vision device 300 examines the glazing 10 in order to detect the inner contour 53 of the hole 51 of the insert 50, herein illustrated through the second glass sheet 30, preferably through the first glass sheet 20 in the following disclosure. Of course, the detection step 201 can equally be performed by one and/or the other of said glass sheets 20, 30.

Preferably, the vision device 300 is a "smart" camera equipped with electronics making it possible to capture, store and process images. Such a camera is known in the field of machine vision. It is referred to as "smart" because it encompasses the normal functions of a computer, but in a more compact manner. It particularly comprises a CCD or CMOS-like digital sensor, a processor and a memory.

Preferably, the vision device 300 communicates, particularly, with a manipulation member such as a robotic manipulator arm (not shown). Alternatively, the vision device 300 comprises a laser sight system or an optical transceiver system with a reflector. These systems are also known.

The vision device 300 detects the inner contour 53 of the hole 51 of the insert 50. During a second step of the method according to the invention, namely a calculation step 202, using the image acquired during the detection step 201, the path to be traveled in order to cut the glass sheet 20, 30 is determined. The vision device 300 sends to the manipulation member (not shown) of a laser source 401 the inner contour 53 of the hole 51 of the insert 50, and consequently the path to be traveled by the manipulation member during a subsequent step.

During a third step of the method according to the invention, namely a cutting step 203, the laser source 401 emitting a beam 402 is implemented, as shown in [FIG. 4]. Preferably, the laser source 401 is manipulated by the robotic manipulator arm (not shown).

Preferably, the laser source 401 is a nanosecond laser having a length of 532 nm, a pulse period between 10 ns and 20 ns, a frequency of 60 kHz and a power of 12 W. Alternatively, the laser source 401 is a picosecond laser or a femtosecond laser.

In the cutting step 203, the first glass sheet 20 is cut along the path calculated during the calculation step 202. Following the cutting step 203, the first glass sheet 20 then comprises a hole 21, as shown in [FIG. 5], and glass debris is produced.

Advantageously, the hole 21 obtained by laser cutting has a roughness less than 3 μm, preferentially less than 2 μm, even more preferentially less than 1 μm.

Advantageously, the path calculated during the calculation step 202 takes into account a shrinkage with respect to the inner contour 53 of the hole 51 of the insert 50 so that the beam 402 emitted by the laser source 401 does not reach the insert 50.

Preferably, this shrinkage is between 0.1 mm and 1 mm, or even between 0.5 mm and 1 mm. Thus, only the first glass sheet 20 is cut.

Optionally, a chamfer is made using the laser source 401 during a finishing step 204, on the edge 25 of the hole 21 so as to eliminate the sharp edge or create a taper in order to subsequently facilitate the introduction of an element such as a sensor.

By applying the method, according to the invention, up until the cutting step 203, or even up until the finishing step 204, only one cut-out is made forming a cavity 11 in the glazing 10 so as to receive a device such as a sensor (for example a capacitive sensor or an IR sensor), or a light diffuser or even a lidar.

When it is sought to obtain a glazing 10 comprising a through-hole 21', as shown in [FIG. 7], the cutting step 203 is modified.

In the modified cutting step 203, use is made of the laser source 401 emitting a beam 402 having the same characteristics as in the cutting step 203.

Firstly, the first glass sheet 20 is cut along the path calculated during the calculation step 202, then the beam 402 is refocused, for example, for a few tenths of a second, then the second glass sheet 30 is cut along the path calculated during the calculation step 202.

Preferably, the laser source 401 remains on the side of the first glass sheet 20 during the modified cutting step 203. Optionally, a chamfer is made using the laser source 401 during a finishing step 204, on the edges 25a, 25b of the hole 21' so as to eliminate the sharp edge or create a taper to subsequently facilitate the introduction of an element.

Alternatively, when it is sought to obtain a glazing 10 comprising a through-hole 21', as shown in [FIG. 7], the method, according to the invention, comprises an additional cutting step 203'.

In the additional cutting step 203', as shown in [FIG. 6], the cutting step 203 is applied by implementing a first laser source 401a emitting a beam 402a, having the same characteristics as previously mentioned for the cutting step 203, disposed on the side of the first glass sheet 20 and a second laser source 401b emitting a beam 402b, having the same characteristics as for the cutting step 203 previously mentioned, disposed on the side of the second glass sheet 30.

Preferably, the first laser source 401a and the second laser source 401b are activated simultaneously so as to reduce the cutting time. Alternatively, either the first laser source 401a is activated first then the second laser source 401b is activated, or the second laser source 401b is activated first then the first laser source is activated 401a.

Optionally, during the finishing step 204, a chamfer is created using the laser source 401a on the edge 25a of the hole 21' and another chamfer using the laser source 401b on the edge 25b of the hole 21' so as to eliminate the sharp edges or create tapers to facilitate the introduction of elements.

The method, according to the invention, makes it possible to obtain an extremely small or even non-existent misalignment between the hole in the first glass sheet 20, the hole in the second glass sheet 30 and the hole 51 of the insert 50.

Advantageously, the laminated glazing 10, 100 comprises a hole 21 in the first glass sheet 20, 120 or a through-hole 21' through the first glass sheet 20, 120 and the second glass sheet 30, 130 which is coaxial to said hole 51, 151 of the insert 50, 150.

Thus, the axis of an attachment means passing through the glazing 10 does not damage the glass sheets due to a better distribution of forces. Such glazing 10 has increased robustness compared to a laminated glazing having alignment defects at the attachment holes.

During the cutting step, glass debris is formed. It is advantageously removed, for example, by gravity or by a vacuum.

The method according to the invention can be implemented by a data-processing system, such as a computer integrated into the vision device 300.

Moreover, the invention can implement an algorithm, also known as a computer program-like product, comprising a sequence of instructions stored and able to be read by a processor, for example that of a computer integrated into the vision device 300 and which, once read by the processor, causes the performance of the steps of the method according to the invention.

A computer-readable medium, for example the computer integrated into the vision device 300, can comprise the algorithm.

Referring now to [FIG. 8], a laminated glazed 80 is schematically illustrated, forming the side window of a motor vehicle, comprising a first hole 81a and a second hole 81b obtained by means of the method according to the invention.

The laminated glazing 80 comprises a so-called visible zone 82, and a so-called non-visible zone 84, which extend on either side of a limit of visibility LV of the glazing, the non-visible zone 84 corresponding to a lower part of the glazing permanently concealed inside the door.

The limit of visibility LV has been depicted in dotted lines in order to identify it. The limit of visibility LV generally corresponds to a licking seal mounted integrally with the door, said licking seal being arranged to engage with the laminated glazing 80, in particular when said glazing 80 slides relative to the door.

The laminated glazing 80 comprises, in said non-visible zone 84 located below the limit of visibility LV, at least one attachment part 86 comprising the first attachment hole 81a and the second attachment hole 81b intended to receive means for attaching the glazing 80 with a drive device (not shown) of said glazing 80.

The attachment means between the glazing 80 and the drive device comprise for example at least a first axis and a second axis intended to pass through the part 86 for attaching the glazing 80, respectively, via the first attachment hole 81a and the second attachment hole 81b. The attachment means associated with the glazing 80 are, for example, means for attachment by screwing.

In a known manner, such attachment means are configured to be rigidly connected to the glazing 80, transversely applying clamping forces on each of the attachment parts 86 due to the screwing.

The drive device (sometimes referred to as "window lift") is controlled selectively to move said glazing 80, according to a translation movement, heightwise between at least one high, so-called closed, position of the door window opening and a low, so-called open, position of all or part of said window opening.

The laminated glazing 80 comprises at least one outer glass sheet and one inner glass sheet which are assembled via an interlayer. The laminated glazing 80 used herein as side glazing is delimited by a generally parallelepipedal perimeter.

The outer glass sheet comprises an outer face and an inner face, respectively oriented towards the outside space of the vehicle and towards the inside space of the vehicle.

As shown in [FIG. 8], the outer glass sheet consecutively comprises an upper edge, a rear edge, a lower edge and a front edge, said opposing upper edge and lower edge extending generally according to the longitudinal orientation and said opposing rear edge and front edge extending generally according to the vertical orientation.

According to the type of the laminated glazing 80, symmetrical or asymmetrical, said at least one attachment part 86 is capable of being particularly made up of all or only part of the sheets that constitute said glazing 80.

The inner glass sheet comprises an outer face and an inner face, respectively oriented towards the outside space of the vehicle and towards the inside space of the vehicle.

In such laminated glazing 10, 100 or 80, at least one of the glass sheets 20, 120, 30, 130 is advantageously thermally strengthened.

Preferably, the first glass sheet 20, 120 and the second glass sheet 30, 130 are thermally strengthened, preferentially the thermal strengthening is of the semi-tempered or hardened type.

Preferably, the first glass sheet 20, 120 and the second glass sheet 30, 130 are of the same composition, particularly a soda-lime, aluminosilicate, borosilicate-like composition.

As a variant, the first glass sheet 20, 120 and the second glass sheet 30, 130 are of a different composition.

Depending on the uses and the type of laminated glazing, the first glass sheet 20, 120 and the second glass sheet 30, 130 are of the same thickness, respectively referred to as e20, e120, e30, e130 for the first and the second configuration previously disclosed, so as to form a symmetrical laminated glazing.

Preferably, in such a symmetrical glazing, said thickness of the glass sheets 20, 120, 30, 130 is between 0.7 mm and 3 mm, preferentially between 1.1 mm and 2.6 mm.

The first glass sheet 20, 120 and the second glass sheet 30, 130 have a different thickness so as to form an asymmetrical laminated glazing, the first glass sheet 20, 120 having a thickness e20, e120 between 1.5 mm and 3.5 mm and the second glass sheet 30, 130 having a thickness e30, e130 between 0.4 mm and 2.6 mm, preferentially between 0.7 mm and 1.6 mm.

Preferably, the first glass sheet 20, 120 and the second glass sheet 30, 130 are of the same hue, particularly clear glass, green glass or dark (or gray) glass.

As a variant, the first glass sheet 20, 120 and the second glass sheet 30, 130 are of a different hue.

The method according to the invention also applies to asymmetrical glazings for which a single glass sheet is cut. The invention is not limited to the application of the method to a side window, but may also be applied, for example, to a roof or a rear window for a motor vehicle or to a laminated glazing intended for fields other than motor vehicles.

The invention claimed is:

1. A method for cutting a laminated glazing comprising at least a first glass sheet, a second glass sheet assembled by an interlayer comprising at least one sheet of polymer material, said glazing further comprising an insert having a hole delimited by an inner contour, said insert being housed in a recess provided in said interlayer, said method comprising:

detecting by a vision device said inner contour;

calculating a cutting path to be traveled based on the detection of said inner contour, and cutting at least said first glass sheet, based on said calculated cutting path, by a laser source having a beam.

2. The method according to claim 1, wherein, during the calculating, a shrinkage with respect to said inner contour between 0.1 mm and 1 mm is calculated so that said beam does not reach the insert during the cutting.

3. The method according to claim 1, further comprising:

a chamfering step by said laser source consisting of chamfering at least one edge of a hole in said first glass sheet resulting from the cutting.

4. The method according to claim 1, wherein, during the cutting, said second glass sheet is also cut based on said calculated cutting path by said laser source.

5. The method according to claim 1, further comprising:

a step of chamfering, by said laser source, at least one chamfer on an edge of said first glass sheet and/or on an edge of said second glass sheet of a through-hole resulting from the cutting.

6. The method according to claim 1, further comprising:

an additional cutting of said second glass sheet by an additional laser source having a beam based on said calculated cutting path.

7. The method according to claim 6, wherein the cutting and the additional cutting are executed simultaneously.

8. The method according to claim 6, wherein the cutting and the additional cutting are executed consecutively.

9. The method according to claim 1, wherein the laminated glazing is a motor vehicle glazing.

10. The method according to claim 2, wherein the shrinkage with respect to said inner contour is between 0.5 mm and 1 mm.

* * * * *